United States Patent
Staniczek

(10) Patent No.: US 6,463,950 B1
(45) Date of Patent: Oct. 15, 2002

(54) METHOD AND DEVICE FOR THE TRANSMISSION OF CONTROL AND/OR SENSOR SIGNALS

(75) Inventor: Dieter Staniczek, Aichwald (DE)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 09/831,394

(22) PCT Filed: Aug. 30, 2000

(86) PCT No.: PCT/EP00/08432

§ 371 (c)(1),
(2), (4) Date: May 7, 2001

(87) PCT Pub. No.: WO01/18763

PCT Pub. Date: Mar. 15, 2001

(30) Foreign Application Priority Data

Sep. 7, 1999 (DE) .......................... 199 42 508

(51) Int. Cl.$^7$ .................. F15B 13/044; F15B 13/06
(52) U.S. Cl. .................. 137/14; 91/459; 137/596.17; 251/129.04
(58) Field of Search .............. 91/459; 137/14, 137/596.17; 251/129.04

(56) References Cited

U.S. PATENT DOCUMENTS

| 4,508,014 A | * | 4/1985 | Shoff | .................. | 137/596.17 |
|---|---|---|---|---|---|
| 5,458,048 A | * | 10/1995 | Hohner | .................. | 91/459 |
| 5,765,589 A | | 6/1998 | Stoll et al. | | |
| 5,823,088 A | * | 10/1998 | Frisch | .................. | 91/459 |

FOREIGN PATENT DOCUMENTS

| DE | 3147339 A1 | 6/1983 |
|---|---|---|
| DE | 3209189 A1 | 9/1983 |
| DE | 19526459 A1 | 1/1997 |

OTHER PUBLICATIONS

"Soviet Inventions Illustrated," Parts I–III Complete, *Derwent Publications Ltd.*, Week X39 (Nov. 3, 1976), R3:Display; Recording, p. 5.

"Soviet Patent Abstracts," World Patents Abstracts, *Derwent Publications Ltd.*, Week 9345, 7 (Jan. 5, 1994), Communications, p. 7.

* cited by examiner

*Primary Examiner*—Gerald A. Michalsky
(74) *Attorney, Agent, or Firm*—Hoffmann & Baron, LLP

(57) ABSTRACT

A method and device for the transmission of control and/or sensor signals between an electronic control and/or data receiving means and a pneumatic device, which are connected together by means of a pneumatic line of flexible plastic material. For the transmission of the signals using acoustic signals, microwaves or changes in pressure in the gaseous medium in the line the control and/or data receiving means and the pneumatic device are provided with at least one first converter for the conversion of electrical signals into acoustic signals or changes in pressure into electrical signal. Accordingly it is possible for electrical lines, otherwise needed for data transmission, to be dispensed with and data transmission takes place by way of the gaseous medium in the pneumatic line.

24 Claims, 2 Drawing Sheets

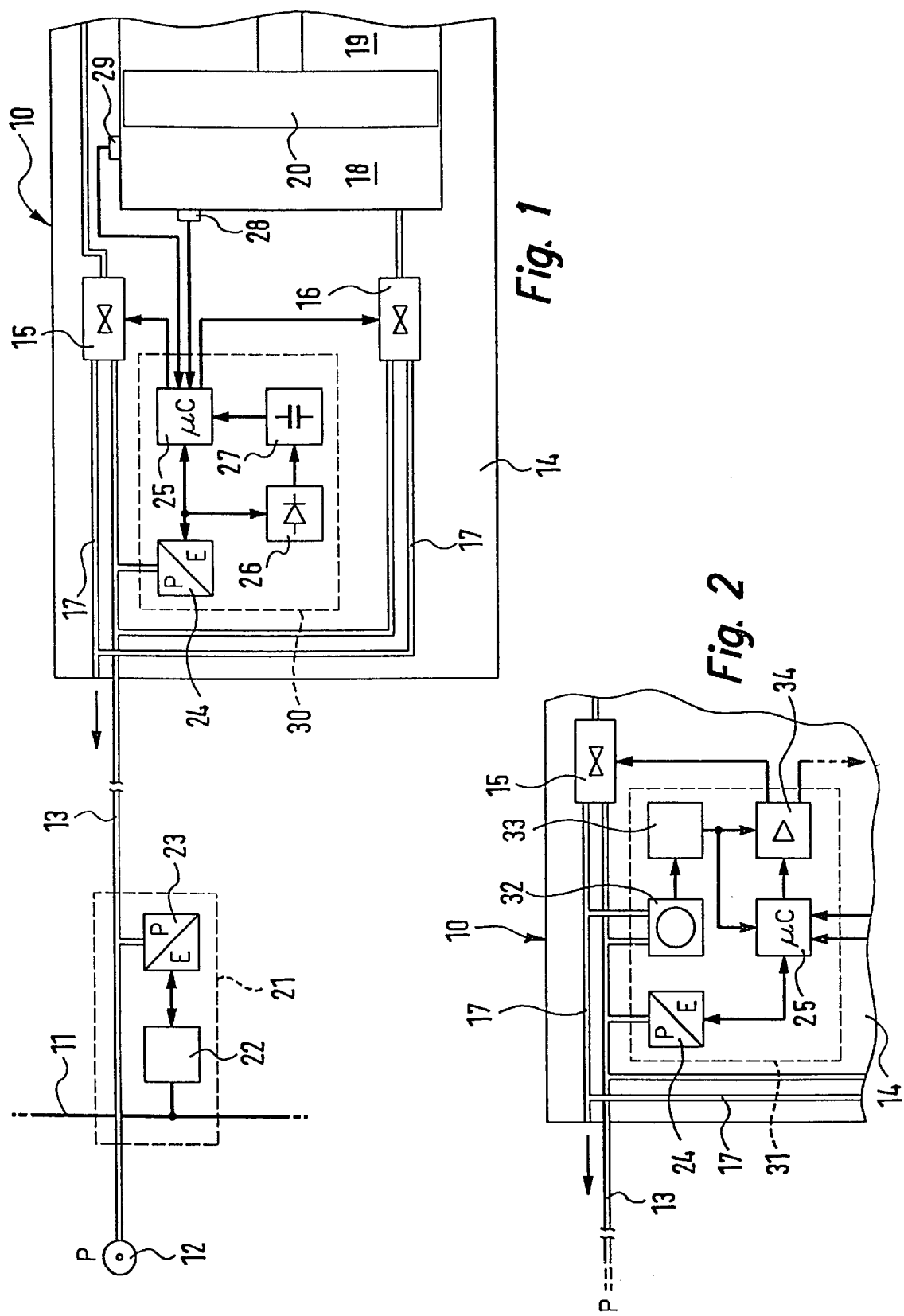

METHOD AND DEVICE FOR THE TRANSMISSION OF CONTROL AND/OR SENSOR SIGNALS

BACKGROUND OF THE INVENTION

This application is a national stage application of International Application Number PCT/EP00/08432 filed on Aug. 30, 2000 which claims priority to German Application No. 19942508.6 filed on Sep. 7, 1999.

1. Field of the Invention

The invention relates to a method and a device for the transmission of control and/or sensor signals between an electronic control and/or data receiving means and a pneumatic device, which are connected together by way of a pneumatic line of flexible plastic material.

2. Description of the Prior Art

For the control of pneumatic equipment, such as valve arrangements, cylinders, drives and the like, there is on the one hand the requirement for the supply of compressed air by way of a pneumatic line and on the other hand for electrical supply lines for the supply of electrical control signals and furthermore return lines for the return of sensor signals. If a plurality of control devices, such as valves, and sensors are arranged on one pneumatic device there is a corresponding increase in the number of electrical lines, something which frequently means that there is a somewhat chaotic arrangement of lines involving high costs for the installation, servicing and repair of such equipment.

Although the German patent publication 19,526,459 discloses the control of a bus station on a valve station having a plurality of valves by way of a bus line, by way of which sensor feedback signals may also be communicated, in this case additional electrical power supply lines and the pneumatic line are required so that there is a considerable complexity of installation.

Although the German patent publication 3,147,339 A1, the German patent publication 3,209,189 A1 and the German patent publication 4,115,403 C2 disclose the transmission of control or sensor data by way of a metallic tube supply system using ultrasound, this method is generally not applicable to pneumatic lines, which normally are made of plastic material

OBJECT AND SUMMARY OF THE INVENTION

Accordingly one object of the present invention is to provide a method and a device by means of which the number of connecting lines leading to a pneumatic device to be controlled may be substantially reduced and installation may be simplified.

The advantage of the device of the invention is more especially that the control information and the sensor signals are simultaneously transmitted using the pneumatic line, which is present in any case present so that special lines are no longer necessary for this. In this case the transmission is by way of the gaseous medium in the form of acoustic signals, microwaves or changes in pressure. Accordingly the transmission of signals is possible in the case of plastic lines as normally employed. It is an advantage here to employ at least one first converter for the conversion of electrical signals into acoustic signals, microwave signals or changes in pressure, and at least one second converter for conversion of such signals into electrical signals.

Transmission of the data takes place bidirectionally in order for example to be able to transmit control signals in one direction and sensor signals in the other direction. For bidirectional data transmission both the control and/or the data receiving means and also the pneumatic device is provided with a first converter and with a second converter, one first converter and one second converter being able to be respectively in the form of combined bidirectional converters. In practice more especially piezoelectric, but also inductive or capacitive converters may be used for this purpose.

For the transmission of different control or sensor signals different frequencies and/or signal sequences and/or pressure modulation and/or pressure pulse sequences are suitable.

In order to dispense with having separate electrical supply lines leading to the pneumatic device, the transmission of power supply energy for the operation of electrical loads on or inside the pneumatic device is also by way of the gaseous medium in the line.

For this purpose it is convenient to provide means for the conversion of acoustic signals or pressure changes or pressure into electrical power energy in or on the pneumatic device.

The acoustic signals or pressure changes are converted in the pneumatic device preferably using the piezoelectric effect at least partially into electrical energy, for which purpose use is preferably made of a piezoelectric converter. As an alternative to this inductive or capacitive converters or an oscillating piston device may be utilized.

In an alternative design it is possible for the electrical power supply energy to be produced in the pneumatic device also by using of the gaseous medium for driving a microturbine or, respectively, a microgenerator device.

In order to ensure that the electrical supply power is continuously available, for instance in the case of a transient peak in the energy requirement, it is an advantage to provide a storage means, and more especially a capacitor or a storage cell, for the storage of the electrical supply energy produced in or on the pneumatic device.

A converter more particularly in the form of a microcomputer in or on the pneumatic device may advantageously serve for the conversion of the transmitted signals into control signals for at least one control means, for example a valve, in the pneumatic device and/or for the conversion of sensor signals into signals to be transmitted by way of the pneumatic line.

The control and/or data receiving means is preferably in the form of a bus station connected with a data bus. In this respect a plurality of pneumatic devices can be connected with this bus station by way of pneumatic lines directly or by way of branch connections.

In the case of systems of large size it is possible furthermore for a plurality of bus stations to be connected with the data bus, which are respectively connected with at least one pneumatic device.

The at least one converter and the means for the supply of electrical power energy are preferably integrated in the pneumatic device so that the arrangements are compact and for complete installation merely have to be connected by way of a single pneumatic line.

Working examples of the invention are illustrated in the drawings and will be explained in the following description in detail.

BRIEF DESCRIPTION OF THE DRAWINGS

FIG. 1 is a block circuit diagram of a device for the transmission of data between a bus station and a pneumatic cylinder.

FIG. 2 shows a similar arrangement to that of FIG. 1 in a detailed view with a microturbine for producing electrical power energy in the pneumatic cylinder.

DETAILED DESCRIPTION OF THE PREFERRED EMBODIMENT

Figure 3:
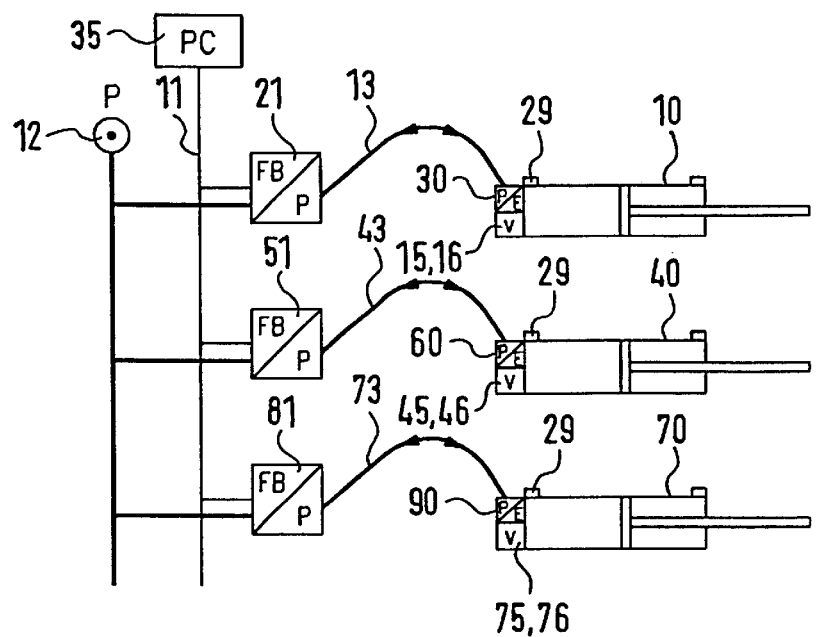
FIG. 3 is a diagrammatic view to show the operation of three pneumatic cylinders by way of three bus stations.

In the case of the working example of the invention illustrated in FIG. 1 one pneumatic cylinder 10 is controlled by way of an electrical data bus 11, as for example a field bus. A pneumatic pressure source 12 is connected by way of a pneumatic line 13, consisting for instance of flexible plastic, with the pneumatic cylinder 10. In terminal region of the pneumatic cylinder 20 housing 14 two valves 15 and 16 are respectively integrated, which for instance are in the form of 3/2 way valves. As an alternative to this it would be possible to have a 4/3 way valve. The two valves 15 and 16 are respectively on one side connected with the pneumatic line 13 and a venting duct 17 and on the other side with one of two cylinder chambers 18 and 19 on either side of a moving piston 20.

Electrical control signals for the valves 15 and 16 are supplied by way of the data bus 11 of an electronic control and data receiving means 21. The latter comprises a bus station 22 connected with the data bus 11, such station 22 being connected by way of a bidirectional converter 23 with the pneumatic line 13. The bidirectional converter 23 is for example designed in the form of a piezoelectric converter and converts the supplied electrical signals into the corresponding acoustic signals or sonic oscillations, which are propagated in the gaseous medium in the line 13 and finally reach a corresponding bidirectional converter 24 in the pneumatic cylinder 10, where they are again converted into corresponding signals. The transmission of the data comprised in the electrical signals takes place either by way of different frequencies, which may extend as far as ultrasonic frequencies and be modulated as well, or by way of acoustic signal sequences or, respectively, corresponding changes in pressure or pressure surges in the gaseous medium. As an alternative it is possible for the transmission to also for example take place using microwaves, which are also propagated in the gaseous medium, suitable microwave converters then being necessary.

The electrical signals produced by the bidirectional converter 24 are supplied in the housing 14 to a microcomputer 25, where they are decoded and, dependent of the result of decoding, are converted into control signals for the two valves 15 and 16.

For supplying the microcomputer 25 with power and (directly or indirectly) the valves 15 and 16 a fraction of the electrical signals produced in the converter 24 is rectified in a rectifier arrangement 26 and supplied to a storage means 27, which for example is in the form of a capacitor. The storage means 27 provides a constant supply of current even when actually no signals are arriving by way of the line 13 or there is a current surge or increased energy requirement. In a simpler design it is possible to dispense with a storage means 27.

Having regard the relatively low level of electrical energy available the valves 15 and 16 are for example in the form of valve arrangements with a multiple pilot function, more particularly with the use of piezoelectric valves.

Customarily sensors are arranged on such pneumatic cylinders 10 or on other pneumatic devices, the sensor signals having to be returned or fed back to the control. In the working example a pressure sensor 28 and a position sensor 29 are illustrated to detect the position of the piston. The same are connected with the inputs of the microcomputer 25, where the corresponding sensor signals are digitalized and encoded and in this form supplied to the bidirectional converter 24. Here they are converted into corresponding acoustic, sonic or pressure signals, and supplied by way of the line 23 to the converter 23, where they are converted back into electrical signals and then supplied i to the bus station 22. The corresponding information is digitalized there and supplied by way of the data bus 11 to a master station, not illustrated, which for example may be a PC.

It is of course possible as well, in the case of decentralized intelligence, to further process the sensor signals partly in the microcomputer 25 and/or in the bus station 22 completely or partially or to take them into account for control.

Instead of the microcomputer 25 another decoding and encoding means may of course be used.

The converter 24, the microcomputer 25, the rectifier arrangement 26 and the storage means 27 in the housing 14 of the pneumatic cylinder 10 are collected together in a control and data transmission means 30, which for example may be inserted bodily or may be adapted to be externally mounted.

Data transmission by way of the line 13 in the two opposite directions may for example be within set time windows or slots or in accordance with the master/slave principle. Furthermore the production of the power energy may for example take place in alternation with data transmission in time windows, or however the storage of energy may occur in the storage means 27 respectively in periods, in which there is no transmission of data such transmission being controlled by the microcomputer 25. As an alternative to this it is also possible for a fraction of the electrical signals to be constantly utilized for power supply.

An alternative design of a control and data transmission means 31 is illustrated in FIG. 2, which may be employed instead of the control and data transmission means 30. Identical or functionally equivalent components or assemblies are given the same reference numerals and not described over again. The power energy is here not derived from the transmitted acoustic signals or changes in pressure in the gaseous medium, and instead the pressure in the gaseous medium is employed for driving a microturbine 32 with a microgenerator mounted thereon or integrated in it. Since the line 13 is constantly under pressure, such power energy may be produced at all times so that no storage means is required, though it however may naturally be provided. The electrical energy produced by the microturbine 32 is processed in a power processing circuit 33 and supplies the microcomputer 25 and furthermore the driver stage 34 connected with the output thereof for operation of the valves 15 and 16. Such a driver stage 34 can of course also be provided in the case of the control and data transmission means 30.

Instead of the microturbine 32 it is possible to provide a different micromechanical system for the production of electrical energy, as for example an oscillating piston arrangement.

The system illustrated in FIG. 3 serves for the operation of three pneumatic cylinders 10, 40 and 70. The control and data receiving means 21 and the pneumatic cylinder 10 with its control and data transmission means 30 and its valves 15 and 16 are the same as in the arrangement of FIG. 1 (or FIG. 2). Two further control and data receiving means 51 and 81 are correspondingly connected with the data bus 11, which is driven using a master station 35 designed in the form of a PC, such receiving means 51 and 81 being connected by way of the lines 43 and 73, which have corresponding control and data transmission means 60 and 90, with the pneumatic cylinders 40 and 70. The pneumatic cylinders 40 and 70 have valves 45 and 46 and, respectively, 75 and 75, corresponding to the valves 15 and 16. It is in this manner that the overall arrangement may be expanded to any desired extent.

Figure 4:
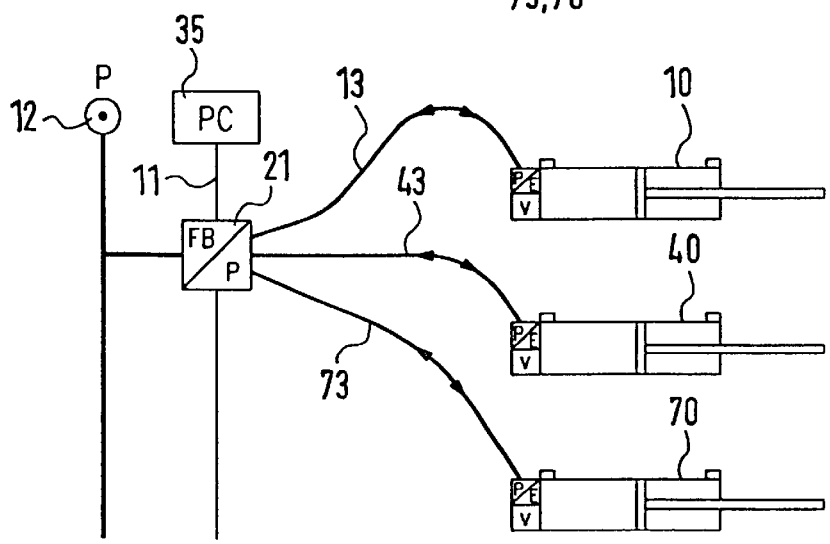
FIG. 4 shows a similar arrangement, in the case of which three pneumatic cylinders are connected with a bus station.
Figure 5:
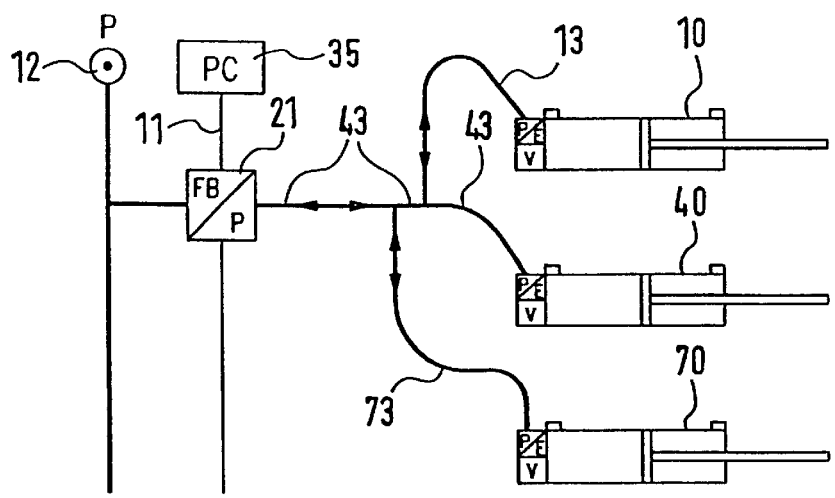
FIG. 5 shows a similar view to that of FIG. 1, in which one connection of a bus station is connected with a bus station by way of branches to three pneumatic cylinders.

As an alternative to this it is also possible, as illustrated in FIG. 4, to control all pneumatic cylinders 10, 40 and 70 using a control and data receiving means 21, with which for this purpose the three pneumatic lines 13, 43 and 73 are connected. In this case in accordance with FIG. 4 further control and data receiving means may be connected with the electrical bus 11, and again control a plurality of pneumatic cylinders or other pneumatic devices and/or receive the sensor signals therefrom. FIG. 5 shows a possible modification of the system in FIG. 4, because here only the pneumatic line 43 is connected with the control and data receiving means 21, whereas the pneumatic lines 13 and 73 are connected by way of branches or T-junctions with this line 43.

The pneumatic cylinders 10, 40 and 70 employed in the working examples are only given as examples. Instead of these pneumatic cylinders or in addition thereto it is possible to employ other pneumatic devices also, such as a valve islands, pneumatic drives, servicing equipment, or plain sensor arrangements, in the case of which no control signals are supplied.

What is claimed is:

1. A method for transmitting signals between an electronic control and data receiving means and a pneumatic device, the pneumatic device being connected by way of a pneumatic line with the electronic control and data receiving means, the pneumatic line having a source of pressure for maintaining a gaseous medium under pressure and at a flow rate, said method comprising the steps of:

transmitting at least one of a control signal and a sensor signal between the electronic control and data receiving means and the pneumatic device through the pneumatic line by at least one of:

acoustic signals;

microwaves; and pressure changes of the gaseous medium.

2. A method for transmitting signals as defined in claim 1, wherein said transmission is bidirectional.

3. A method for transmitting signals as defined in claim 1, wherein the signals are defined by at least one parameter including:

a frequency;

a signal sequence;

a pulse sequence; and an ability to be modulated, and wherein at least two different control signals and sensor signals are transmitted by altering said parameter.

4. A method for transmitting signals as defined in claim 1, wherein energy is transmitted by the gaseous medium in the pneumatic line for operating electrical loads associated with the pneumatic device.

5. A method for transmitting signals as defined in claim 4, wherein a microturbine having an electrical generator converts the pressure of the gaseous medium into electrical power.

6. A method for transmitting signals as defined in claim 4, wherein at least one of said acoustic signals and said pressure changes of the gaseous medium are:

transmitted through the pneumatic line; and converted at least partially into electrical power by a piezoelectric converter.

7. A device for transmitting signals between an electronic control and data receiving means and a pneumatic device, the pneumatic device being connected by way of a pneumatic line with the electronic control and data receiving means, the pneumatic line having a source of pressure for maintaining a gaseous medium under pressure and at a flow rate, said device comprising:

a first converter for converting at least one of a control signal and a sensor signal into at least one of an acoustic signal and a pressure change in the gaseous medium; and a second converter for converting of said at least one of an acoustic signal and pressure change in the gaseous medium into an electrical signal.

8. A device for transmitting signals as defined in claim 7, wherein said first converter is provided at the control and data receiving means; and said second converter is provided at the pneumatic device.

9. A device for transmitting signals as defined in claim 8, further comprising:

a first converter provided at the pneumatic device; and a second converter provided at the control and data receiving means, whereby bidirectional transmission of signals is provided.

10. A device for transmitting signals as defined in claim 9, wherein said first converter and said second converter are configured together as a bidirectional converter.

11. A device for transmitting signals as defined in claim 7, wherein said first converter and said second converter are a piezoelectric converter.

12. A device for transmitting signals as defined in claim 7, wherein said first converter and said second converter are at least one of a capacitive converter and an inductive converter.

13. A device for transmitting signals as defined in claim 7, further comprising: a conversion means for converting energy transmitted through the pneumatic line into electrical power, said energy being transmitted by at least one of: acoustic signals; and pressure changes of the gaseous medium.

14. A device for transmitting signals as defined in claim 13, wherein said conversion means is at least one of: a converter; and an oscillating piston arrangement.

15. A device for transmitting signals as defined in claim 14, wherein said conversion means is a converter which is identical to at least one of said first converter and said second converter.

16. A device for transmitting signals as defined in claim 13, wherein said conversion means is a microturbine having an electrical generator that converts the pressure of the gaseous medium into electrical power.

17. A device for transmitting signals as defined in claim 13, further comprising a storage means for storing at least a portion of the electrical power produced by said conversion means.

18. A device as claimed in claim 17, wherein said storage means is a capacitor.

19. A device as claimed in claim 17, wherein said storage means is a storage cell arrangement.

20. A device for transmitting signals as defined in claims 7, wherein the pneumatic device includes:
   a control device for controlling the pneumatic device; and
   a sensor for monitoring the pneumatic device; and
   said device further comprises:
   a microcomputer for communicating with both the control device and the sensor.

21. A device for transmitting signals as defined in claim 20, further comprising: a conversion means for converting energy transmitted through the pneumatic line into electrical power, said energy being transmitted by at least one of:
   acoustic signals; and pressure changes of the gaseous medium; and
   wherein said second converter, said conversion means, and said microcomputer are integrated in the pneumatic device.

22. A device for transmitting signals as defined in claim 7, wherein the control and data receiving means is configured as a bus station connected to a data bus.

23. A device for transmitting signals as defined in claim 22, wherein a plurality of pneumatic devices are connected by way of a plurality of pneumatic lines with said control and data receiving means.

24. A device for transmitting signals as defined in claim 22, wherein a plurality of control and data receiving means are connected with said data bus, each of said plurality of control and data receiving means being connected with at least one pneumatic device.

* * * * *

UNITED STATES PATENT AND TRADEMARK OFFICE
CERTIFICATE OF CORRECTION

PATENT NO.    : 6,463,950 B1
DATED         : October 15, 2002
INVENTOR(S)   : Staniczek It is certified that error appears in the above-identified patent and that said Letters Patent is hereby corrected as shown below:

Column 4,
Line 14, now reads "and then supplied i to the bus station" should read
-- and then supplied to the bus station --

Signed and Sealed this

Fourth Day of March, 2003

JAMES E. ROGAN
*Director of the United States Patent and Trademark Office*